United States Patent
Pessin et al.

(10) Patent No.: US 7,731,411 B2
(45) Date of Patent: Jun. 8, 2010

(54) CIRCULATING FLUID SYSTEM FOR POWDER FLUIDIZATION AND METHOD OF PERFORMING SAME

(75) Inventors: Jean-Louis Pessin, Houston, TX (US); Gregoire Jacob, Blois (FR); Ismail El Kholy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1063 days.

(21) Appl. No.: 11/205,559

(22) Filed: Aug. 17, 2005

(65) Prior Publication Data

US 2006/0220266 A1 Oct. 5, 2006

Related U.S. Application Data

(60) Provisional application No. 60/668,000, filed on Apr. 4, 2005.

(51) Int. Cl.
*B01F 13/02* (2006.01)
(52) U.S. Cl. .......... 366/107; 366/106; 366/137
(58) Field of Classification Search .......... 366/3, 366/10, 101, 106–107, 136–137, 348; 222/195
See application file for complete search history.

(56) References Cited

U.S. PATENT DOCUMENTS

| | | | | |
|---|---|---|---|---|
| 3,276,753 | A * | 10/1966 | Solt et al. | 366/107 |
| 3,410,792 | A | 11/1968 | Driesen | |
| 3,583,681 | A * | 6/1971 | Brown | 366/107 |
| 3,627,555 | A * | 12/1971 | Driscoll | 106/472 |
| 3,822,919 | A * | 7/1974 | Strom | 406/90 |
| 3,886,855 | A * | 6/1975 | Nara | 99/323.11 |
| 4,172,539 | A | 10/1979 | Botkin | 222/195 |
| 4,223,044 | A * | 9/1980 | Se | 426/318 |
| 4,466,082 | A * | 8/1984 | Zoschak et al. | 366/101 |
| 4,556,173 | A | 12/1985 | Pausch et al. | 239/533.13 |
| 4,662,543 | A | 5/1987 | Solimar | 222/195 |
| 4,756,117 | A | 7/1988 | Friemel | |

(Continued)

FOREIGN PATENT DOCUMENTS

BE 548 471 11/1959

(Continued)

OTHER PUBLICATIONS

SPE 20642—*A Comparison of Mixed-Gas Foams with N2 and CO2 Foam Fracturing Fluids on a Flow-Loop Viscometer*.

*Primary Examiner*—Charles E Cooley
(74) *Attorney, Agent, or Firm*—Mike Flynn; David Cate; Robin Nava

(57) ABSTRACT

An aeration system for circulating an aerating fluid through a chemical composition within a container. The aeration system is closed-loop such that the aeration fluid is supplied by a fluid supply system to the interior of a container to aerate the chemical composition therein. The aeration fluid is returned to the fluid supply system for subsequent redelivery to the container. A filtering mechanism may be employed to remove large particulate matter from the aeration fluid prior to flowing back to the fluid supply system. The aeration process improves the flowability of the chemical composition thus facilitating the transferring and/or discharging of the chemical composition from the container. The aeration process may occur during transport, prior to discharging, and/or during a discharging or transferring operation.

18 Claims, 4 Drawing Sheets

U.S. PATENT DOCUMENTS

| | | | |
|---|---|---|---|
| 4,762,684 A * | 8/1988 | Chantriaux et al. | 422/106 |
| 4,821,782 A | 4/1989 | Hyer | 141/83 |
| 4,907,892 A * | 3/1990 | Paul | 366/101 |
| 5,018,869 A * | 5/1991 | Paul | 366/101 |
| 5,071,289 A | 12/1991 | Spivak | 406/11 |
| 5,152,604 A * | 10/1992 | Paul | 366/101 |
| 5,497,873 A | 3/1996 | Hay | 198/642 |
| 5,551,516 A | 9/1996 | Norman et al. | 166/308 |
| 5,833,092 A | 11/1998 | Godfrey et al. | 222/168 |
| 6,007,234 A * | 12/1999 | Steele | 366/101 |
| 6,170,976 B1 | 1/2001 | Sisk | 366/101 |
| 6,205,931 B1 | 3/2001 | Degutis et al. | 105/248 |
| 6,354,727 B1 * | 3/2002 | Toyoda et al. | 366/102 |
| 6,488,091 B1 | 12/2002 | Weaver et al. | 166/300 |
| 6,558,111 B2 | 5/2003 | Wilson et al. | 414/810 |
| 7,540,308 B2 * | 6/2009 | Pessin et al. | 141/11 |
| 2006/0272735 A1 * | 12/2006 | Pessin et al. | 141/69 |

FOREIGN PATENT DOCUMENTS

| | | |
|---|---|---|
| EP | 1533022 A2 * | 5/2005 |
| RU | 2187770 | 8/2002 |
| SU | 426681 | 1/1975 |

* cited by examiner

CIRCULATING FLUID SYSTEM FOR POWDER FLUIDIZATION AND METHOD OF PERFORMING SAME

CROSS-REFERENCE TO RELATED APPLICATIONS

This application claims the benefit of U.S. Provisional Application No. 60/668,000, filed on Apr. 4, 2005. The disclosure of the above application is incorporated herein by reference.

FIELD OF THE INVENTION

The present invention relates to the preparation of subterranean formation treatment compositions, and more particularly, but not by way of limitation, an apparatus and method for circulating a fluid through a chemical composition within a container in the preparation and/or delivery of these compositions.

BACKGROUND OF THE INVENTION

In the oil drilling and production industry, chemical compositions, typically in the form of viscous aqueous fluids, are used in subterranean operations for such purposes as the development and completion of wellbores that penetrate subterranean formations, and the production of gaseous and liquid hydrocarbons from natural reservoirs. Viscous aqueous fluids are also used as carrier fluids. These viscous aqueous fluids can be used in operations that include perforating subterranean formations, fracturing subterranean formations, modifying the permeability of subterranean formations, or even controlling the production of sand or water from subterranean formations. Some compositions employed in these oilfield operations are commonly known as drilling compositions, completion compositions, work-over compositions, packer compositions, fracturing compositions, stimulation compositions, conformance or permeability control compositions, consolidation compositions, and the like. Such viscous aqueous fluids may be used as fracturing fluids, acidizing fluids, cementing mixture, and high-density completion fluids. Often such chemical compositions are additives, crosslinkers, or polymer compositions, and in the case of viscosifying agents, may be agents such as guar, guar-derived polymer compositions, cellulose, or cellulose-derived polymer compositions. These viscous fluids are often an aqueous solution of these chemical compositions. For example, the viscous aqueous fluid can be an aqueous solution of a dry powder polymer material.

The chemical compositions are typically transported by bulk transporters, bins and reservoirs to the field district or field location in order to be discharged, stored and/or pumped into a well. When the chemical composition is in a powder or dry form, the discharging process or transfer process of the powdered chemical composition requires the use of a transfer or discharge device, such as a transfer pump or a feeder, and may include the use of a metering device. The powdered chemical composition is also commonly discharged by gravity. In many of these discharge and transfer processes, the powdered chemical composition is aerated to facilitate removal from the bulk transporters, bins or reservoirs to another container, or a processing system (i.e., mixing system, conditioning system, storing system, etc.).

In order to aerate the powdered chemical compositions, a dry fluid, such as air having a moisture content less than a predetermined value, is often required to avoid solidification or agglomeration of the powdered chemical composition during the aeration process. The injected dry fluid for aeration is exhausted from the container and released into the atmosphere. The releasing of the exhausted aeration fluid into the atmosphere, however, may require filtering in order to remove particulates within the released fluid, such as for health or environmental reasons. The filtering of the fluid released from the container to health and environmental safe levels, can be very costly, especially for fine particles. Additionally, the releasing of the fluid into the atmosphere requires the use of an external source of the dry fluid to replace the fluid that is being released so that the aeration process can continue.

Prior art on the aeration of powders includes devices to inject the fluid inside the container. Patents dealing with the aeration devices themselves include U.S. Pat. No. 4,172,539 to Botkin for "AERATOR NOZZLE," issued Oct. 30, 1979; U.S. Pat. No. 4,530,173 to Pausch et al. for "BIN FLUIDIZER," issued Dec. 3, 1985; U.S. Pat. No. 4,662,543 to Solimar for "AERATION DEVICE FOR ASSISTING IN AERATION OF MATERIAL FROM CONTAINERS," issued May 5, 1987; and U.S. Pat. No. 6,170,976 to Sisk for "PREASSEMBLED FLUIDIZING DEVICE HAVING EXPANSIVE AIR PASSAGE STIMULATING ENHANCED FLOW OF GRANULAR MATERIALS IN TANK TRAILERS AND CONTAINERS," issued Jan. 9, 2001. These prior art patents assume dry fluid is readily available from an external source and are not concerned with limited supply of the dry fluid. These patents also do not teach the concern of exhausting the aerating fluid, other than going through an external filter and exhausting the cleaned fluid to the atmosphere. This implies a filter cleaning the fluid to health and environmental safe levels. As stated above, such filtering may be costly.

Thus, it would be advantageous to provide an apparatus for and a method of aerating the powdered chemical composition while avoiding or minimizing one or more of the drawbacks stated above. That is, it would be advantageous to avoid the necessity of providing costly filtering equipment to filter the aerating fluid. Furthermore, it would be advantageous to avoid and/or minimize the necessity of using an external source of a dry fluid to aerate the powdered chemical composition.

SUMMARY OF THE INVENTION

To alleviate one or more disadvantages associated with the venting of the fluid to the atmosphere and/or the requirement for a continuous supply of dry fluid with which to aerate, the invention is directed toward use of a closed-loop circulating fluid system for aerating the chemical composition in a substantially dry form (e.g., in powder form) for subterranean treatment operations. The inventors have discovered that some chemical compositions, such as viscosifying polymer compositions, crosslinkers, additives, chelants, surfactant, delay agents, proppants, breakers, and the like, in powder form can become compacted for various reasons and particularly tend to become compacted due to vibrations which occur during transport. The compaction can hinder the transferring of the chemical compositions from the bulk transporters, bins or reservoirs to another container or a processing system (i.e., mixing system, conditioning system, storing system, etc.). To improve the flowability of the powdered chemical composition, a closed-loop aeration system is utilized to recirculate a dry fluid through the powdered chemical composition. Such recirculation provides a fluid flow to aerate the powdered chemical composition while avoiding the filtering requirements associated with venting of the fluid to the atmosphere. Additionally, the recirculation of the dry fluid advantageously minimizes the quantity of dry fluid necessary to aerate and improve the flowability of the powdered chemical composition within the container.

In one aspect of the invention, a method of aerating a powdered chemical composition is disclosed. The method includes the steps of (1) supplying a fluid flow to a container having a powdered chemical composition therein, the fluid flow being supplied by a fluid supply device; (2) aerating at least a portion of the powdered chemical composition by selectively introducing the fluid flow into the powdered chemical composition within the container; (3) routing the fluid flow from the container back to the fluid supply device after being introduced into the powdered chemical composition; and (4) recirculating the fluid flow through the powdered chemical composition within the container and through the fluid supply device by performing steps (1)-(3), as desired, whereby a discharging of the powdered chemical composition is improved.

In another aspect of the invention, a method of transferring a powdered chemical composition is disclosed. The method includes the steps of: (1) selectively introducing a fluid flow into a powdered chemical composition within a first container, the fluid flow being supplied by a fluid supply apparatus; (2) returning the fluid flow to the fluid supply apparatus; (3) recirculating the fluid flow through the powdered chemical composition within the first container and through the fluid supply apparatus, whereby a flowability of the powdered chemical composition is improved; and (4) transferring the powdered chemical composition from the first container to a second container.

In yet another aspect of the present invention, an aeration system for aerating in a chemical composition is disclosed. The aeration system includes a fluid-tight container operable to hold a chemical composition therein. There is at least one fluid delivery device operable to introduce a fluid flow into a chemical composition within the container. A fluid supply system is operable to selectively supply a fluid flow to the fluid delivery device. There is a supply flow path through which the fluid supply system supplies the fluid flow to the fluid delivery device. There is also a return flow path extending between the container and the fluid supply system through which the fluid flow returns to the fluid supply system. The fluid flow is recirculated through the container and the fluid supply system thereby forming a closed-loop flow path for the fluid flow.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Illustrative embodiments of the invention are described below. In the interest of clarity, not all features of an actual implementation are described in this specification. It will, of course, be appreciated that in the development of any such actual embodiment, numerous implementation specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The present invention relates to the preparation of subterranean formation treatment compositions, and more particularly, but not by way of limitation, an apparatus and method for transferring and conditioning dry polymer materials in the preparation and/or delivery of treatment compositions.

Aeration of powdered chemical compositions, such as viscosifying polymer compositions, crosslinkers, additives, chelants, surfactants, delay agents, proppants, breakers, and the like, can be utilized to improve the flowability of the powdered chemical compositions. As flowability is improved, metering of the powdered chemical compositions may also be improved. As used herein, the term "viscosifying polymer compositions" means any suitable polymer composition for treating a subterranean formation, such as, by non-limiting example, guar, guar-derived polymers, cellulose, cellulose-derived polymers, xanthan gum, or synthetic polymers such as polyacrylamides and polyacrylamide copolymers, and the like.

Embodiments of the invention provide at least two main advantages over the prior art. First, a conditioned fluid, such as dried air having a relative humidity less than a predetermined value, is circulated without the addition of a conditioning device. This provides cost, energy, and/or volume savings, especially for high volume low pressure delivery systems. Second, embodiments of the invention avoid the need or necessity for a filtering/cleaning system required for cleaning the exhausted fluid before it is released into the environment.

Some embodiments of the invention may be useful for transferring a powdered material, such as a chemical composition, in a conditioned environment, by adding a fluid to aerate the powder. Also, the invention may be used for aerating liquids as well. Further, the embodiments are not limited to only transferring material, but may also be useful for metering, energizing, or even changing the density of materials.

Figure 1:
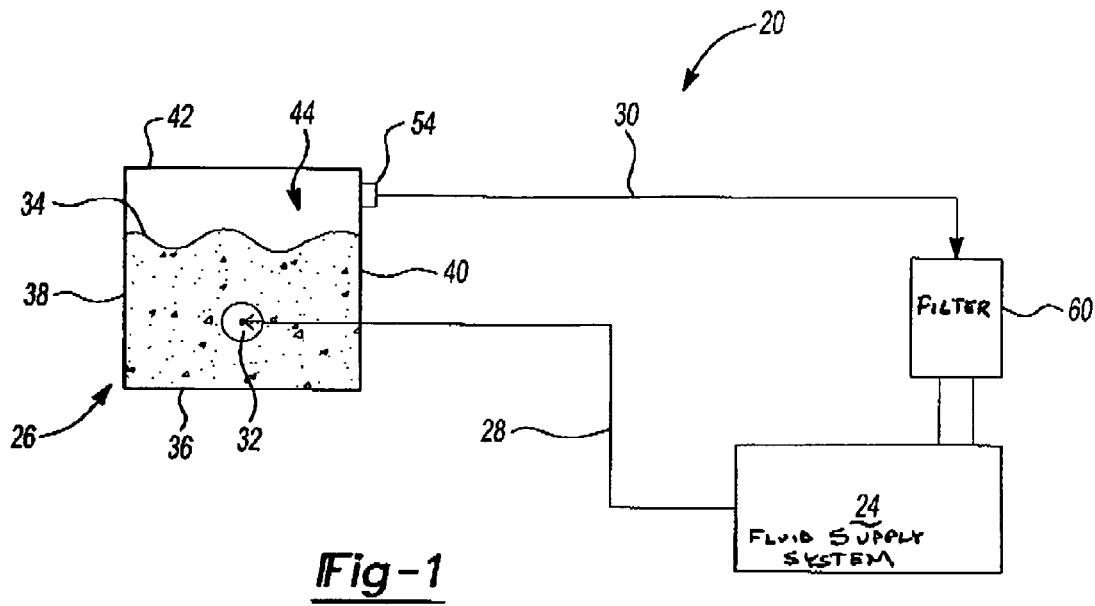
FIG. 1 is a general schematic view of an aeration system for circulating fluid through a powdered chemical composition in a container according to the principles of the present invention.
Figure 2:
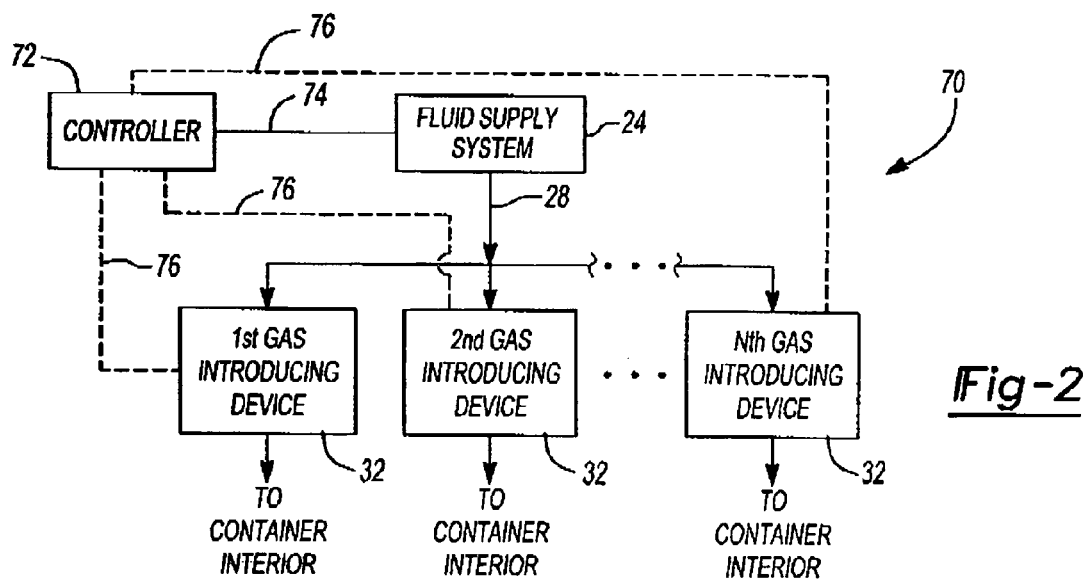
FIG. 2 is a schematic representation of a control system for use with the aeration system of FIG. 1 according to the principles of the present invention.
Figure 3:
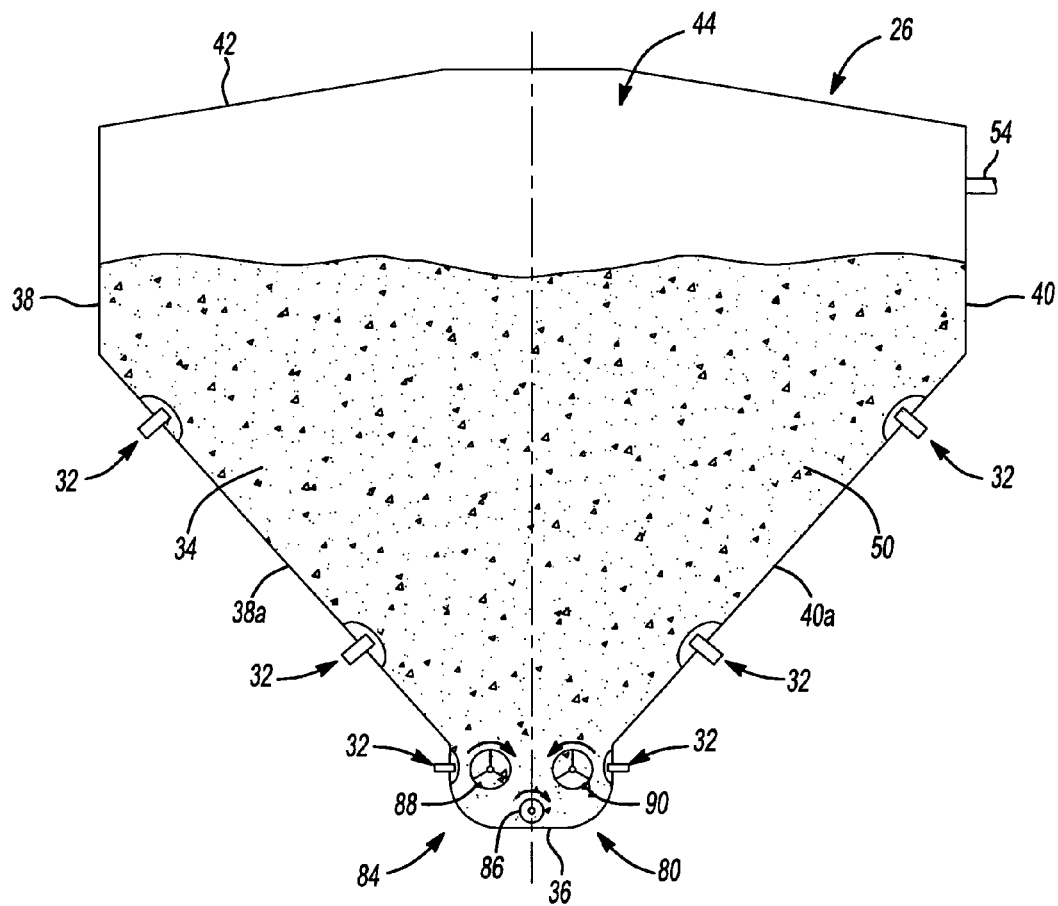
FIG. 3 is a schematic cross-sectional representation of a transport container with which the aeration system of FIG. 1 can be employed.

Some embodiments of the invention use recirculation of a fluid in a closed-loop system between the container holding the dry particulate material and the fluid-supplying system, such as an air-blower system. Referring to FIG. 1, a schematic of a closed-loop aerating system 20 for aerating a powdered chemical composition within a container is shown. Aerating system 20 includes a fluid supply system 24 such as, for example, a compressor, blower, injector or pump, operable to selectively supply an aerating fluid to a container 26 via appropriate supply plumbing 28 and to collect the aerating fluid from container 26 via appropriate return plumbing 30. In one embodiment, fluid supply system 24 is a blower system operable to supply a flow of dry air (air having a relative humidity below a predetermined value) to container 26 and to receive the dry air from container 26. It should be appreciated, however, that the aeration fluid is not limited to dry air. For example, the aeration fluid can include other fluids, such as inert gases, such as, by way of non-limiting example, carbon dioxide, nitrogen, argon and the like, as well as the above-mentioned air.

Fluid supply system 24 can be operated to selectively supply a flow of the aeration fluid to container 26. By the phrase "selectively supply," it is meant that the fluid flow can be a steady steam of fluid, pulsed flows of the fluid or a combination thereof, in patterned or random order.

Fluid supply system 24 is interconnected with container 26 via appropriate supply plumbing 28. Supply plumbing 28 communicates with one or more fluid-injecting devices 32. Injecting devices 32 are located at various locations along container 26, as described in more detail below. Injecting devices 32 can take a variety of forms. For example, injecting devices 32 can include simple holes, one or more nozzles, one or more elastomeric cups attached to the interior of container 26 in which the fluid is injected under the cups, and one or more permeable membranes, such as a felt cloth or finely divided, consolidated metal particles (porous metal) or a finely perforated pad through which the fluid can be injected into container 26. Other examples of possible injecting devices include those disclosed in U.S. Pat. Nos. 6,170,976; 4,662,543; 4,530,173; and 4,172,539, mentioned above.

Container 26 is operable to hold or store a powdered chemical composition 34 therein. Container 26 can take a variety of forms. Suitable examples include, but are not limited to, a bin, can, silo or tank. Additionally, container 26 can also be a static or stationary container that is not moved or can be a mobile container such that it is capable of being transported from one location to another. For example, container 26 can be attached to or contained on the bed of a vehicle, a railcar, and the like.

Container 26 generally includes a bottom 36, sidewalls 38, 40 and a top or lid 42. Bottom 36, sidewalls 38, 40 and top 42 form an interior cavity 44 within which powdered chemical composition 34 may be disposed. Cavity 44 is selectively sealed such that aeration fluid flowing into and exiting cavity 44 can be controlled and only flows through designated entry and exit points or locations. By the phrase "selectively sealed," it is meant that interior cavity 44 of container 26 can be sealed, when desired, to provide limited entry and exit points for fluid flowing therein and can be opened such that there are multiple points for entering and exiting of fluid flowing therein and/or the adding and removal of the powdered chemical composition to/from interior cavity 44.

An outlet 54 communicates with interior cavity 44 and is operable to route the aeration fluid supplied by fluid supply system 24 back to fluid supply system 24. Appropriate return plumbing 30 interconnects outlet 54 with an inlet to fluid supply system 24. Outlet 54 can be a single outlet or multiple outlets. Additionally, outlet 54 can be disposed on a sidewall 38, 40 or top 42 of container 26. At least one outlet 54 is located on container 26 in a position that resides above the level of the powdered chemical composition 34 disposed therein.

In some embodiments, an optional filtering mechanism 60 may be placed along return plumbing 30 such that the aeration fluid flows through filtering mechanism 60 prior to flowing back into fluid supply system 24. Such filtering mechanism 60 may be used to remove the larger-sized powder particles that are contained within the fluid flow and would prevent fluid supply system 24 from working correctly. It should be appreciated that filtering mechanism 60 is not comparable to a filtering mechanism that would be required to clean the aeration fluid from any particles deteriorating the air quality in order to meet health or environmentally safe levels. That is, filtering mechanism 60 is not sufficient to allow the venting of the aeration fluid directly into the environment. A suitable type of filtering mechanism 60 includes but not limited to cartridge type, media type, bag type and cyclone filtration systems.

In one embodiment, a control system, such as that shown in FIG. 2, is utilized to control the operation of aerating system 20. Control system 70 may include a selectively operable controller 72 that controls the operation of fluid supply system 24 and/or each injecting device 32. Controller 72 can take a variety of forms. For example, controller 72 can be as simple as one or more manually operable open/close or proportional valve(s). Alternatively, if greater control is desired, controller 72 can be an electrical or pneumatic controller that can automatically individually control fluid supply system 24 and/or each injecting device ($1^{st}$ to the $N^{th}$) 32 via the appropriate connections 74, 76, respectively, therebetween. Regardless of the type of controller utilized, control system 70 is operable to selectively supply a fluid flow to injecting devices 32 as needed.

In one embodiment, container 26 may take the form of that shown in FIG. 3. In this embodiment, container 26 has an interior cavity 44 with a lower discharging/feeder portion 80. Cavity 44 is defined by longitudinally-extending sidewalls 38, 40 and a bottom surface 36. Each sidewall 38, 40 has a tapering portion **38*a*, 40*a* that taper toward each other as they extend toward discharge portion 80 and bottom surface 36. Tapering portions 38*a*, 40*a* facilitate the flow of the powdered chemical composition 34 within cavity 44 toward discharge portion 80. A metering device/apparatus 84 is disposed within discharge portion 80 of cavity 44. Metering device 84 controls the quantity and rate at which powdered chemical composition 34 is discharged from container 26. Metering device 84 includes a longitudinally-extending metering screw 86 and a pair of longitudinally-extending agitators 88, 90 that help feed the powdered chemical composition 34 into metering screw 86**.

Container 26 has a plurality of injecting devices 32 each connected to supply plumbing 28 for receiving a fluid flow from fluid supply system 24. As illustrated, injecting devices 32 are preferably located along sidewalls 38, 40 and in proximity to discharge portion 80. The introduction of the aerating fluid, such as by non-limiting example, air, nitrogen, carbon dioxide and the like in gaseous form into powdered chemical composition 34 reduces the bulk density of the powdered chemical composition 34 within container 26 and increases the flowability of the composition at the time of discharge.

Container 26 also includes a top 42 that is sealed to sidewalls 38, 40. Top 42 may include one or more access ports or inlets (not shown) that enable powdered chemical composition 34 to be added thereto. Outlet 54 communicates with interior cavity 44 and with return plumbing 30. Outlet 54 is positioned on sidewall 40 in a location that is above the level of powdered chemical composition 34. It should be appreciated, however, that outlet 54 could also be disposed on top 42, if desired.

The methods of the present invention are applicable to a variety of powdered chemical compositions, such as viscosifying polymers and others discussed above. The viscosifying polymer in substantially dry form (powder) is typically ground to very small dimensions. Preferably, the median particle size of the viscosifying polymer is in the range of from about 40 to about 60 microns (but could be of any particle size). This small particle size aids in the rapid hydration and viscosification of the well treatment fluid, and facilitates continuously mixing a fluid. The bulk density of the viscosifying polymer is generally in the range of from about 340 to about 700 kilograms per cubic meter (but could be of any density).

Figure 4:
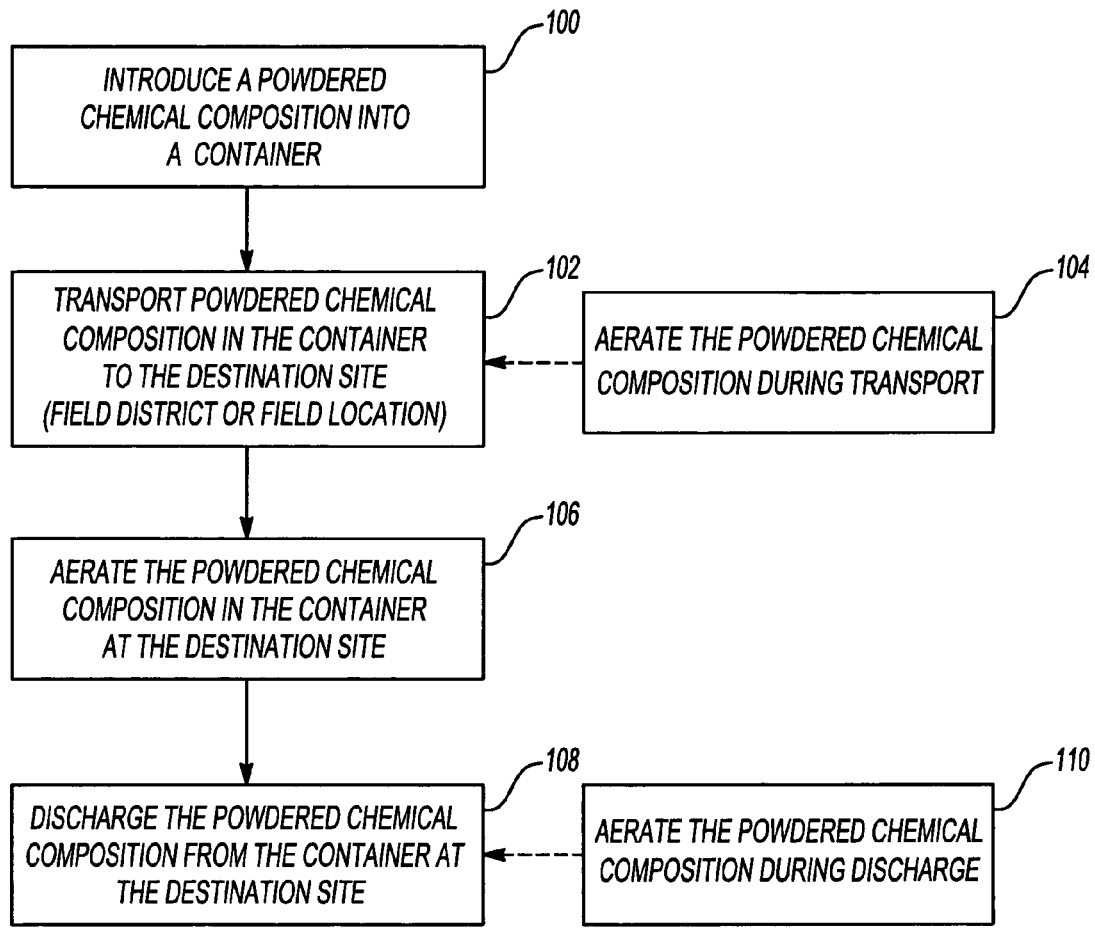
FIG. 4 is a flowchart of a method of transferring a powdered chemical composition with the aeration system of FIG. 1, according to the principles of the present invention.

Referring to FIG. 4, a method of transporting and discharging/transferring a powdered chemical composition is shown. The powdered chemical composition 34 is packed into container 26, as indicated in block 100, which may be a bulk transporter, a storage bin, silo or a reservoir. Container 26, in the case of a mobile container, is then transported from the supply site to a destination site, such as by non-limiting example, a field district or a field location, as indicated in block 102, in order to be discharged, transferred, stored and/or pumped into a well. Container 26 can be transported over the roadway and/or railways or other suitable means of transport. Optionally, as indicated in block 104, the powdered chemical composition can be aerated during transport, as described in more detail below. When the powdered chemical composition is aerated during transport, an appropriate fluid supply system 24 is included either with container 26 and/or the vehicle transporting container 26 so that aerating system 20 can be realized.

Upon arriving at the destination site, the powdered chemical composition may be aerated, as indicated in block 106, and as described below. If needed, a local fluid supply system 24 can be connected to container 26 to aerate the powdered chemical composition. The aeration process is described in more detail below. The aeration of the powdered chemical composition decreases the bulk density and thereby conditions the powdered chemical composition to an improved flowable state. The aeration process may also energize and/or fluidize the powdered chemical composition.

With the powdered chemical composition flowable, the chemical composition can be discharged from container 26 at the destination site, as indicated in block 108. The discharging process may use a discharging device, such as a transfer pump or a feeder. The discharging can also be accomplished via gravity. If desired, metering device 84 can be operated to discharge the powdered chemical composition from container 26. Optionally, as indicated in block 110, the aeration process can continue during the discharging of the powdered chemical composition.

Figure 5:
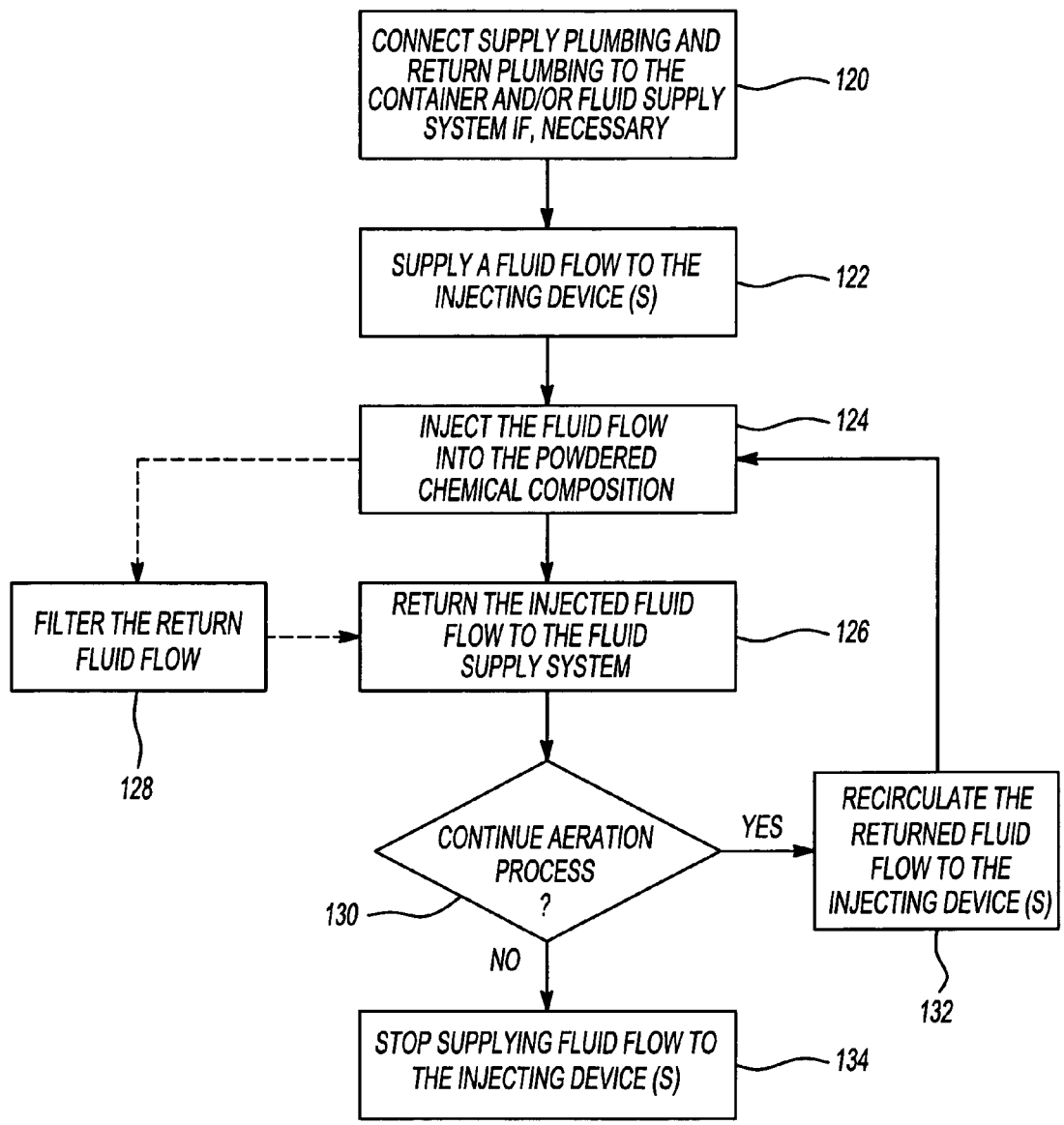
FIG. 5 is a flowchart of a method of aerating a powdered chemical composition with the aeration system of FIG. 1, according to the principles of the present invention.

Referring now to FIG. 5, the method of aerating the powdered chemical composition with aeration system 20 is shown. To aerate the powdered chemical composition within container 26, supply plumbing 28 and return plumbing 30 are connected to container 26 and/or fluid supply system 24, if necessary, as indicated in block 120. Container 26 may already have supply plumbing 28 and return plumbing 30 attached to the respective injecting devices 32 and outlet 54. In this case, supply plumbing 28 is connected to the appropriate connectors on fluid supply system 24 and return plumbing 30 is attached to the appropriate connectors on fluid supply system 24 or, optionally, to the appropriate connectors on filtering mechanism 60 which is connected to fluid supply system 24. Alternatively, fluid supply system 24 may include supply plumbing 28 and return plumbing 30 such that supply and return plumbing 28, 30 are attached to the respective injecting devices 32 and outlet 54 of container 26. Regardless of whether supply plumbing 28 and return plumbing 30 are attached to container 26 or fluid supply system 24, the appropriate connections, if necessary, are made to form aerating system 20.

To begin the aeration process, a fluid flow is supplied to injecting devices 32, as indicated in block 122, with fluid supply system 24. To accomplish this, controller 72 is operated to cause fluid supply system 24 to supply a conditioned fluid flow (fluid flow having desired properties, such as a desired moisture level) to injecting devices 32. The fluid flow to injecting devices 32 is injected into the interior cavity 44 of container 26 and through powdered chemical composition 34 therein, as indicated in block 124. Controller 70, if so designed, can command each injecting device 32 individually or in a group to selectively inject the fluid flow into the powdered chemical composition 34 within container 26, as desired. The injected fluid flows through powdered chemical composition 34 thereby aerating the powdered chemical composition and decreasing the bulk density. This operation conditions the powdered chemical composition 34 to an improved flowable state and facilitates the discharging operation. The aeration may also energize and/or fluidize the powdered chemical composition. The aerating fluid may be the fluid that currently exists within container 26 and/or fluid supply system 24. Alternatively, if needed, fluid supply system 24 may include a limited supply of aerating fluid having the desired physical properties. It should be appreciated, however, that such a limited supply would not be sufficient to enable fluid supply system 24 to adequately aerate the powdered chemical composition within container 26 absent the recirculation of the aerating fluid. This limited supply could also serve to back flush the filtration system.

The fluid injected into the interior cavity 44 of container 26 is returned to fluid supply system 24 via return plumbing 30, as indicated in block 126. Optionally, as indicated in block 128, the returning fluid flow can be routed through filtering mechanism 60 prior to returning to fluid supply system 24. In this case, filtering mechanism 60 removes particulate matter from the fluid flow that would be damaging to fluid supply system 24. If the aeration process is to continue, as indicated in decision block 130, the fluid flow is recirculated to the injecting devices 32 with fluid supply system 24, as indicated in block 132. The recirculated fluid flow is then injected into the powdered chemical composition again and returned to the fluid supply system 24, as indicated in blocks 124, 126. Again, optionally, the recirculated fluid flow can be filtered prior to returning to fluid supply system 24, as indicated in block 128. The recirculation of this fluid flow continues until it is desired to end the aeration process, as indicated by decision block 130. When it is desired to discontinue the aeration process, controller 72 is operated to cause fluid supply system 24 to stop supplying the fluid flow to injecting devices 32, as indicated in block 134.

Accordingly, the present invention facilitates the aeration of a chemical composition in dry form (i.e., powdered) within a container. The aeration of the chemical composition enhances the flowability and facilitates the discharge of the chemical composition. The aeration system advantageously recirculates the conditioned aerating fluid thereby avoiding the necessity of including a conditioning device to supply additional conditioned fluid. The avoidance of this conditioning device provides costs, energy and/or volume savings. Additionally, the recirculation of the aerating fluid avoids the need for a filtering/cleaning system necessary for cleaning the aerating fluid to health and environmental safe levels associated with exhausting the aerating fluid into the environment. The aerating system is also useful for transferring a powdered material in a conditioned environment, by adding a fluid flow to aerate the powder. Also, the present invention may be used for aerating liquids as well. Further, the embodiments are not limited to only transferring material, but may also be useful for metering, energizing, or even changing the density of the materials being aerated.

An exemplary embodiment includes a method of transferring a powdered chemical composition. The method includes the operations of selectively introducing a fluid flow into a powdered chemical composition within a first container, the fluid flow being supplied by a fluid supply apparatus, returning the fluid flow to the fluid supply apparatus, recirculating the fluid flow through the powdered chemical composition within the first container and through the fluid supply apparatus, whereby a flowability of the powdered chemical composition is improved, and transferring the powdered chemical composition from the first container to a second container. Certain embodiments of the method include routing the fluid flow through a filtering device prior to reaching the fluid supply apparatus, and further removing large particulate matter from the fluid flow with the filtering device, where the fluid flow is unsuitable for venting to the atmosphere after having flowed though the filtering device. In certain embodiments, the routing is performed while at least part of the recirculating is performed. In certain embodiments, the method includes supplying the fluid flow as a flow of air, returning the flow of air, and recirculating the flow of air.

Another exemplary embodiment is an aeration system for aerating a chemical composition, the aeration system including a fluid-tight container operable to hold a chemical composition therein, fluid delivery device(s) operable to introduce a fluid flow into a chemical composition within the container, a fluid supply system operable to selectively supply a fluid flow to the fluid delivery device, a supply flow path through which the fluid supply system supplies the fluid flow to the fluid delivery device, a return flow path extending between the container and the fluid supply system and through which the fluid flow returns to the fluid supply system, where the fluid flow is recirculated through the container and the fluid supply system forming a closed-loop flow path for the fluid flow. In certain embodiments, the system includes a metering device operable to meter a quantity of the chemical composition during discharging of the chemical composition from the container, and further includes at least one agitator operable to agitate the chemical composition within the container. In certain embodiments, the system includes a filtering device operable to remove particulate matter from the fluid flow, the filtering device forming a portion of the return flow path such that the fluid flow passes through the filtering device prior to returning to the fluid supply system, where the fluid supply system may include a blower where the fluid flow is an air flow. The fluid delivery devices may be disposed at a plurality of discrete locations along the container, and the chemical composition may be a powdered chemical composition.

The methods of the invention are useful in subsurface operations, including such operations as fracturing subterranean formations, modifying the permeability of subterranean formations, fracture or wellbore cleanup, acid fracturing, matrix acidizing, gravel packing or sand control, and the like. Another application includes the placement of a chemical plug to isolate zones or to assist an isolating operation.

When used in fracturing operations, techniques for hydraulically fracturing a subterranean formation will be known to persons of ordinary skill in the art, and will involve pumping a fracturing composition, often including a powdered chemical composition, into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987). In the fracturing treatment, the compositions delivered by methods of the invention fluids may be delivered in the pad treatment stage, the proppant stage, or both. The fracturing materials are preferably mixed on the surface. Alternatively, the materials may be mixed downhole. The invention may also be useful when gravel packing a wellbore. While the presently preferred embodiments of the invention have been described herein with reference to specific components, functionality and operation, it should be appreciated that changes and deviations from that disclosed can be employed without departing from the spirit and scope of the present invention. For example, additional components (not shown) may be included within aeration system 20 to enable, facilitate and/or enhance the operation of aeration system 20. Such components may include, by non-limiting example, valves employed along the various flow paths to aid in the controlling of the fluid flow therethrough, check valves, vacuum breakers and/or pressure relief valves to facilitate the operation of aeration system 20. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A method of aerating a powdered chemical composition comprising:
   (a) supplying a fluid flow to a container having a powdered chemical composition therein, the fluid flow being supplied by a fluid supply device;
   (b) aerating at least a portion of the powdered chemical composition by selectively introducing the fluid flow into the powdered chemical composition within the container;
   (c) routing the fluid flow from the container back to the fluid supply device after being introduced into the powdered chemical composition; and
   (d) recirculating the fluid flow through the powdered chemical composition within the container and through the fluid supply device in a closed loop path by performing steps (a)-(c), as desired,
   wherein the fluid flow is not utilized for transporting the powdered chemical composition from an aeration system comprising the container and the closed loop path.

2. The method of claim 1, wherein step (c) includes routing the fluid flow through a filtering device prior to reaching the fluid supply device, and wherein the aeration system further includes the filtering device.

3. The method of claim 2, further comprising removing large particulate matter from the fluid flow with the filtering device, the filtering device being unsuitable for venting the fluid flow to the atmosphere after having flowed therethrough.

4. The method of claim 1, wherein step (c) includes routing the fluid flow through an outlet on the container that is above a level of the powdered chemical composition and through a flow path extending between the outlet and the fluid supply device.

5. The method of claim 1, wherein the fluid flow is an air flow and step (a) includes supplying a flow of conditioned air having a moisture content less than a predetermined level.

6. The method of claim 1, wherein step (b) includes introducing a plurality of gas flows into the powdered chemical composition at a plurality of discrete locations within the container.

7. The method of claim 1, wherein step (b) includes introducing a steady gas flow into the powdered chemical composition.

8. The method of claim 1, wherein step (b) includes introducing pulses of gas flow into the powdered chemical composition.

9. The method of claim 1, further comprising discharging the powdered chemical composition from the container and wherein step (b) is performed during the discharging operation.

10. The method of claim 1, wherein step (a) includes supplying a gaseous fluid flow, step (b) includes introducing the gaseous fluid flow, step (c) includes routing the gaseous fluid flow and step (d) includes recirculating the gaseous fluid flow.

11. The method of claim 1, whereby step (b) fluidizes the powdered chemical composition.

12. The method of claim 1, whereby step (b) energizes the powdered chemical composition.

13. The method of claim 1, whereby step (b) changes a density of the powdered chemical composition.

14. The method of claim 1, further comprising discharging the powdered chemical composition from the container, the discharging improved by aerating the powdered chemical composition.

15. The method of claim 1, further comprising discharging the powdered chemical composition from the container in a direction opposite the fluid flow in the container.

16. The method of claim 1, further comprising mechanically discharging the powdered chemical composition from the container.

17. The method of claim 1, further comprising gravity feeding the powdered chemical composition within the container to a discharging device.

18. The method of claim 17, wherein the discharging device comprises a metering screw.

* * * * *